United States Patent [19]
Roseman et al.

[11] Patent Number: 5,623,197
[45] Date of Patent: Apr. 22, 1997

[54] ACTIVE CONTROL OF BATTERY CHARGING PROFILE BY GENERATOR CONTROL UNIT

[75] Inventors: Ronald W. Roseman, Walton Hills; Kevin E. Rice, Stow, both of Ohio

[73] Assignee: Lucas Aerospace Power Equipment Corporation, Aurora, Ohio

[21] Appl. No.: 232,704

[22] Filed: Apr. 25, 1994

[51] Int. Cl.$^6$ ........................................ H02J 7/14
[52] U.S. Cl. ........................................ 320/61; 320/63
[58] Field of Search ........................... 320/22, 23, 30, 320/35, 36, 39, 40, 61, 62, 63, 57; 322/14, 17, 27, 33, 99, 25

[56] References Cited

U.S. PATENT DOCUMENTS

| | | | |
|---|---|---|---|
| 4,217,645 | 8/1980 | Barry et al. | 320/48 X |
| 4,280,097 | 7/1981 | Carey et al. | 320/48 X |
| 5,049,804 | 9/1991 | Hutchings | 320/20 |
| 5,119,011 | 6/1992 | Lambert | 320/43 |
| 5,153,496 | 10/1992 | LaForge | 320/17 |
| 5,245,268 | 9/1993 | Wang | 320/35 |
| 5,352,968 | 10/1994 | Reni et al. | 320/35 |

FOREIGN PATENT DOCUMENTS 2073512   10/1981   United Kingdom .

*Primary Examiner*—Edward H. Tso
*Attorney, Agent, or Firm*—Rankin, Hill, Lewis & Clark

[57] ABSTRACT

A system for actively controlling the charging profile of a battery uses a software-based generator control unit to control the charging voltage. The voltage may be initially reduced following battery discharge to prevent large current inrush transients. The voltage may then be raised above a normal charging level to increase the battery charging rate. The control system provides better control over battery charging prevent overheating of the battery and generator and allows the battery to be recharged more quickly.

23 Claims, 1 Drawing Sheet

ACTIVE CONTROL OF BATTERY CHARGING PROFILE BY GENERATOR CONTROL UNIT

BACKGROUND OF THE INVENTION

1. Field of the Invention

This invention relates to rechargeable electrical batteries, and more particularly to a method and apparatus for controlling the charging profile of a battery.

2. Description of the Prior Art

General aviation aircraft have a battery which provides electrical energy to the aircraft electrical system. The battery is usually a rechargeable battery, such as a nickel-cadmium battery, a lead-acid battery or other type of rechargeable battery. This battery is also used to operate a starter motor to start the aircraft engine. After a battery powered engine start cycle, the aircraft battery is substantially discharged, and it is frequently desired to recharge the battery as quickly as possible.

In many aircraft applications, the battery is charged using a constant voltage supplied directly from the aircraft DC bus. Constant voltage charging has several advantages. Since the battery is connected directly to the bus, it does not require additional hardware such as battery chargers. It does, however, inherently provide a high initial inrush of current into a discharged battery after an engine start. The charge current is initially quite large. After the initial high inrush current, a smaller charging current, determined by the bus voltage, continues to recharge the battery. In order to accommodate the battery's allowable charge current, the bus voltage must be set to a voltage value so that the initial inrush current is not too high. However, this lowers the level of the subsequent smaller charging current, and this relatively small charge current results in a fairly long battery recharge time.

The constant potential method also has other disadvantages. As the desired battery charge voltage varies, it is difficult to have one optimal voltage setting for all conditions. If the bus voltage is set too high, battery overcharging will occur, or if the bus voltage is set too low, the battery will not be charged to capacity. Large charging currents can cause generator overloads. Overcharging can lead to excessive heating of the battery, and heat, whether generated internally or external, is a prime source of battery degradation.

Overcharging can also lead to a phenomenon know as thermal runaway. Thermal runaway is a condition where a battery on a constant potential charge, typically at elevated temperature, will destroy itself through internal heat generation. The heat is generated as a result of overcharge currents. An increase in temperature causes a battery voltage drop which in turn leads to an increase in overcharging currents. This is a regenerative situation where the current and temperature then rapidly rise until the battery is destroyed.

Some control over battery charging and battery overtemperature protection has been accomplished in the past using dedicated battery chargers and temperature monitors. This equipment is used to eliminate generator overloads caused by high battery charge currents. However, the addition of these separate pieces of equipment increases the overall weight of the aircraft and the complexity of the electrical system.

More recently, the inventors herein have developed a microprocessor-based generator control unit. This unit is fully disclosed in co-pending U.S. patent application Ser. No. 08/131,196, assigned to the assignee of the present invention.

It would be desirable to implement the functions of battery charging control in the generator control unit which already controls and monitors many of the aircraft electrical system parameters, including parameters which could be used for controlling battery charging.

SUMMARY OF THE INVENTION

The present invention provides a system for monitoring and controlling battery charging so that optimal battery charging is accomplished, avoiding large initial inrush current and allowing the battery to continue charging more quickly. The present invention provides these features through a unique apparatus and a method for actively controlling the charging profile of the battery. Instead of charging the battery using a constant voltage or constant potential, the present invention contemplates changing the voltage experienced by the battery to provide optimal charging conditions.

The present invention utilizes the voltage regulating function of a generator control unit to provide a battery charging profile. Preferably, the generator control unit is software based to provide increased flexibility in generating the optimal charging profile. This profile provides improved electrical system performance as compared to constant voltage battery charging.

In accordance with the invention, the voltage supplied to the battery is initially reduced following engine start when initial battery recharging begins. The battery during initial recharging is substantially discharged, and a reduction in charging voltage reduces large battery inrush current transients. Following initial recharging, the battery charging voltage is increased above the normal voltage level to increase the charging rate of the battery and thus shorten the time within which battery charging occurs. When the battery has been substantially charged, the voltage is reduced to the normal battery charge level to maintain the battery in a charged condition.

To further accommodate aircraft battery installations, a battery temperature sensing feature may be added to the generator control unit. The temperature sensing feature includes the presence of a temperature sensor which measures the temperature of the battery. The temperature sensor is connected to the generator control unit, so that the generator control unit can modify the battery charging profile according to battery temperature. For example, if the battery temperature is high, the charging voltage profile is reduced to prevent overcharging of the battery, since it is known that, as battery temperature increases, the voltage required for an overcharge condition decreases.

The present invention can be used in conjunction with a microprocessor based generator control unit, so that the functions of the generator control unit can be software based, allowing flexibility in design and modification. The invention utilizes the voltage regulator function of the generator control unit to provide a time dependent, varying voltage profile to the battery.

In addition to or in place of voltage regulation, other battery charging parameters may also be controlled, such as current monitoring. The generator control unit would be used to bias voltage on the bus to achieve the desired current. These operations can be preformed using the software-based capabilities of the generator control unit with additional interface circuitry.

By reducing the initial charging voltage, heating is reduced in both the battery and in the generator. Thermal runaway and generator overloads are avoided. The invention also allows flexibility in coordinating the generator rating, electrical aircraft loads, and maximum battery charging current.

Furthermore, the present invention provides more efficient battery charging. By increasing the charging voltage above the continuous constant voltage charge rate, battery recharge can be accomplished in a shorter period of time.

In addition to using the invention to provide a fixed battery recharging profile that is useful in most situations, the present invention may be used to develop a customized charging profile for particular applications. Once the generator control unit has been connected to control the battery charging, the generator control unit may be used to monitor battery powered engine start cycles, and this information obtained can be used to determine the battery charging profile.

These and other advantages are provided by the present invention of a battery recharging system which comprises a generator connected to drive means for producing electrical energy on a bus. Voltage regulator means are connected to generator for controlling the voltage of the electrical energy on the bus. A battery is connected for receiving recharging energy from the bus. The battery is also connected to provide electrical energy to start the engine. Generator control means are connected to the voltage regulator means for controlling the voltage on the bus used by the battery for recharging. The generator control means may decrease the voltage when the battery is discharged to prevent excessive current from entering the battery. In addition or alternatively, the generator control means may increase the voltage when the battery is discharged to increase the charge rate of the battery.

DETAILED DESCRIPTION OF THE PREFERRED EMBODIMENT

Figure 1:
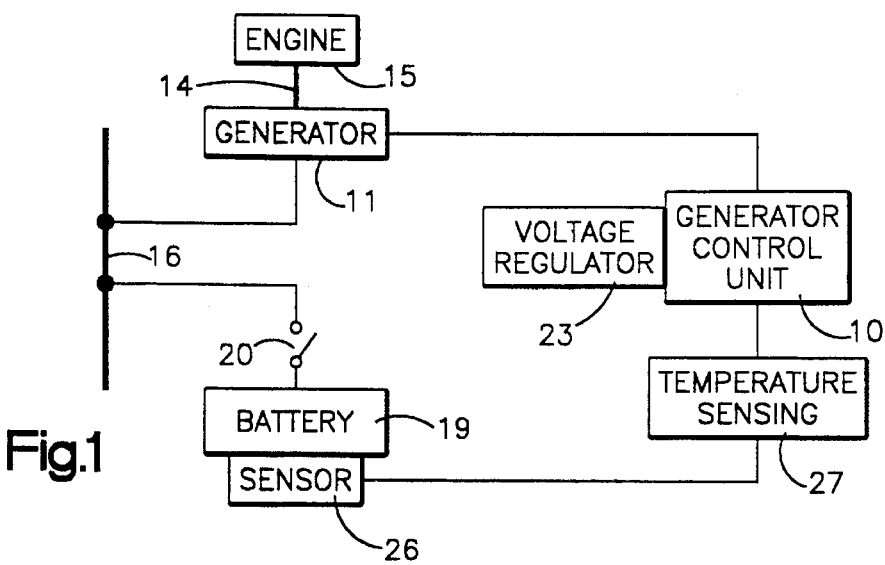
FIG. 1 is a schematic view of the apparatus of the present invention.

Referring more particularly to the drawings and initially to FIG. 1, there is shown schematically the system of the present invention. The system includes a generator control unit 10 which may be the unit described in full in co-pending U.S. patent application Ser. No. 08/131,196, the disclosure of which is incorporated by reference herein in its entirety. The generator control unit 10 is connected to monitor and control the operation of a generator 11. As is fully disclosed in the aforementioned patent application, the generator control unit 10 includes a programmable micro-processor, so that all of the functions of the unit 10 can be software based. The use of a microprocessor increases the number of monitoring and control functions that can be integrated into the control unit 10. This increased flexibility permits the control unit to provide additional monitoring and control functions not used with prior controllers. Among these additional functions that can be provided by the generator control unit 10 are the incorporation of or interface with a voltage regulator, as fully disclosed in U.S. patent application Ser. No. 08/131,196, to control the voltage level of the output of the generator, and a connection to a temperature sensing circuit to determine the temperature of the battery.

The generator 11 is a starter/generator which is directly connected to the drive shaft 14 of the aircraft engine 15 and which functions as an electrical generator using the power of the aircraft engine when the engine is operating to operate the electric components of the aircraft, and which also functions as a starter for starting the engine. When functioning as a starter, the starter/generator 11 may use external power, or it may use battery power if external power is not available. The armature of the generator 11 is connected to the main aircraft DC bus 16 from which electrical power from the generator is supplied to the aircraft electrical components and from which the starter/generator receives power to start the aircraft engine 15.

The electrical bus 16 is also connected to a battery 19 through a switch 20. The battery 19 is preferably a rechargeable nickel-cadmium battery, such as those generally used to operate a general aviation DC electrical system. During operation of the engine 15, the battery 19 is charged by power supplied on the bus 16 from the generator 11, and the power of the battery is then used to operate the aircraft electrical system. During engine start, the battery 19 may be used to power the starter/generator 11 which is then operating in the starter mode.

After a battery powered engine start cycle, the aircraft battery 19 is partially discharged. In accordance with many prior art designs, the battery, which was connected directly to the aircraft DC bus 16, was charged from this constant voltage source. When the battery was discharged after engine start, a constant voltage recharge resulted in initially high charging currents. However, it is frequently desired to quickly recharge the battery 19 while avoiding exceptionally large charging currents.

In accordance with this invention a voltage regulator 23 is provided as a part of the generator control unit 10 and is used to regulate the voltage output from the generator 11, so that the voltage experienced by the battery during recharging is regulated. The interconnection or interface between the voltage regulator 23 and the generator control unit 10 is fully disclosed in the aforementioned U.S. patent application Ser. No. 08/131,196.

While not necessary for the operation of the battery recharging system of the present invention, a temperature sensor 26 may also be provided for the battery 19 as shown in FIG. 1. The temperature sensor 26 may be, for example, a thermistor. The temperature sensor 26 is connected to a temperature sensing circuit 27 which processes the analog levels from the sensor 26 into a digital form that can be used by the generator control unit 10 and provides other functions. The battery temperature sensing circuit 27 may include, for example a buffer amplifier. The buffer amplifier isolates and amplifies the signal from the sensor. A small amount of integrating action is also provided to provide noise immunity.

The invention utilizes the voltage regulator interface function of the generator control unit 10 to provide a time dependent, varying voltage profile to the battery 19. The profile may be tailored for individual applications.

Figure 2:
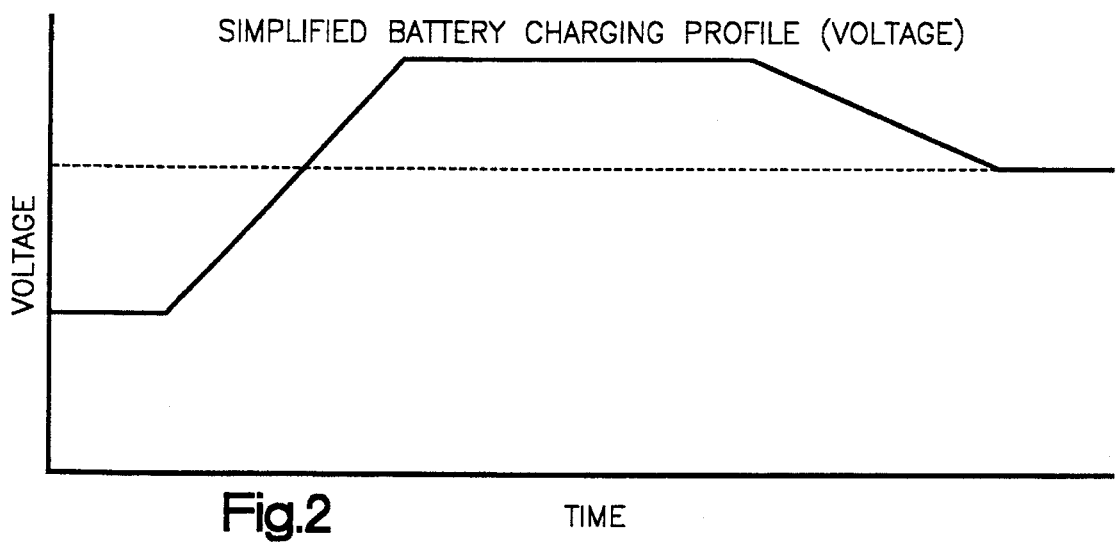
FIG. 2 is a graph depicting a simplified battery charging profile showing the variation of voltage as a function of time.
Figure 3:
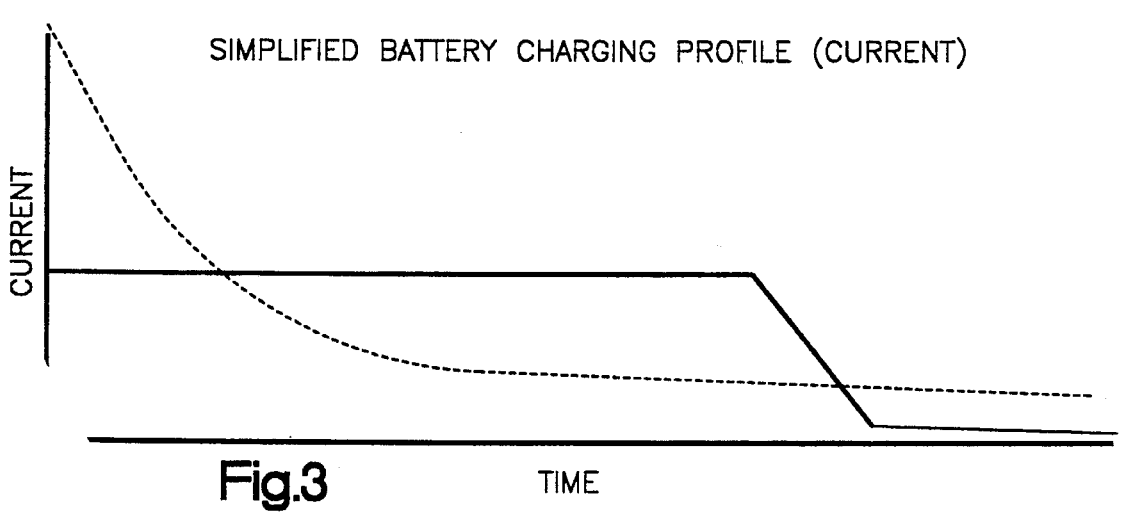
FIG. 3 is a graph similar to FIG. 2 depicting the same simplified battery charging profile showing the variation of current as a function of time.

A typical profile is shown in FIGS. 2 and 3. Following engine start, the electrical system enters the initial battery charge mode. The generator output voltage on the bus 16 is initially lowered slightly by the voltage regulator 23 under control of the generator control unit 10 to eliminate the large battery inrush current transient that normally occurs immediately after an engine start. By lowering the voltage, heating is reduced in both the battery 19 and in the generator 11 which must supply the voltage. Lowering the initial current requirements of the generator also allows flexibility in coordinating the generator rating, electrical aircraft loads, and maximum battery charging current.

After the battery 19 has partially charged, reducing the charging current, the generator control unit 10 directs the voltage regulator 23 to increase the generator output voltage on the bus 16 providing a higher battery charge rate and quicker recharge. The higher output voltage is greater than the continuous constant voltage charge rate normally provided on the bus 16.

Finally, when the battery 19 is fully charged, the voltage is then reduced to the lower, continuous charge rate value. This voltage level is maintained to maintain the charge of the battery and prevent overcharging and overheating which would occur if the higher output voltage were maintained.

The generator control unit 10 may also be programmed to provide temperature compensation during battery charging. It is known that, as battery temperature increases, the voltage required for an overcharge condition decreases. By the addition of the temperature sensor 26 in the battery 19 and appropriate software in the generator control unit 10, it is possible to add a form of temperature compensation to the recharging process. The generator control unit 10 then biases the charging voltage according to the temperature. Additionally, the battery temperature is monitored and when the battery temperature exceeds a predetermined threshold, an output signal can be provided. This signal may be used to illuminate an over-temperature indicator or to automatically open the battery switch 20, removing the battery from the bus, to prevent a thermal runaway condition. To further protect the system, independent circuitry on the generator control unit 10 monitors the output of the battery temperature sensing circuit 27. If the control unit 10 detects out of limit operation as would occur with an open or shorted temperature sensing thermistor, the temperature adjustments are inhibited. The voltage regulator 23 then regulates the generator output according to a predetermined default profile without regard to temperature corrections. Additionally, an output signal is provided from the generator control unit to illuminate a failed sensor indicator.

Once the generator control unit 10 has been connected to control the battery charging, the generator control unit may be used to monitor battery powered engine start cycles, and this information obtained can be used to determine the battery charging profile. The generator control unit 10 can monitor the engine start current taken from the battery 19 by the starter/generator 11, and the generator control unit can then modify the battery charge profile based upon the monitored current. During a battery powered engine start cycle, the generator control unit 10 monitors the generator armature current and integrates the armature current over time. In order to perform this integration, the generator control unit sums periodic measurements at specific time intervals. The integrated armature current gives an indication as to the total amount of energy taken from the battery 19 during the start cycle and may be used to determine an optimum battery charging profile. For example, a longer charge cycle should be used after a high energy (high current, long duration) start, or a short charge cycle may be preferable after a low energy start.

While the battery recharging system of the present invention is shown using the generator control unit 10 and the voltage regulator 23, other battery charging parameters may also be controlled in addition to or in place of voltage regulation. For example, the generator control unit 10 may be used to monitor current to the battery and to control charging current to desired levels, such as by biasing voltage on the bus to achieve the desired current. These operations can be preformed using the software-based capabilities of the generator control unit 10, but they would require interface circuitry in addition to that disclosed herein and in U.S. patent application Ser. No. 08/131,196.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way this is inconsistent with the extent to which the progress in the art has been advanced by the invention.

What is claimed is:

1. A battery recharging system for an engine, which comprises:

a generator connected to drive means for producing electrical energy on a bus;

voltage regulator means connected to generator for controlling the voltage of the electrical energy on the bus;

a battery connected for receiving recharging energy from the bus, the battery also connected to provide electrical energy to start the engine; and generator control means connected to the voltage regulator means for controlling the voltage on the bus used by the battery for recharging, the generator control means varying the voltage according to a predetermined charging profile, the generator control means decreasing the voltage when the battery is discharged to prevent excessive current from entering the battery.

2. A battery recharging system as defined in claim 1, wherein the generator control means also increases the voltage when the battery is partially recharged to increase the charge rate of the battery.

3. A battery recharging system as defined in claim 1, wherein the generator control unit is software based to allow the charging profile to be set and changed by changing software.

4. A battery recharging system as defined by claim 1, wherein the generator control means is connected to monitor battery powered engine start cycles, and modifies the charging profile in accordance therewith.

5. A battery recharging system as defined in claim 4, comprising in addition means for sensing the temperature of the battery, the temperature sensing means connected to the generator control means, the generator control means modifying the charging profile according to the battery temperature.

6. A battery recharging system as defined in claim 1, wherein the charging profile can be independent of battery temperature.

7. A battery recharging system for an engine, which comprises:

a generator connected to drive means for producing electrical energy on a bus;

voltage regulator means connected to generator for controlling the voltage of the electrical energy on the bus;

a battery connected for receiving recharging energy from the bus, the battery also connected to provide electrical energy to start the engine; and generator control means connected to the voltage regulator means for controlling the voltage on the bus used by the battery for recharging, the generator control means varying the voltage according to a predetermined charging profile, the generator control means increasing the voltage when the battery is discharged to increase the charge rate of the battery.

8. A battery recharging system as defined in claim 7, wherein the generator control means also decreases the voltage when the battery is initially recharged to prevent excessive current from entering the battery.

9. A battery recharging system as defined in claim 7, wherein the generator control unit is software based to allow the charging profile to be set and changed by changing software.

10. A battery recharging system as defined by claim 7, wherein the generator control means is connected to monitor battery powered engine start cycles, and modifies the charging profile in accordance therewith.

11. A battery recharging system as defined in claim 7, comprising in addition means for sensing the temperature of the battery, the temperature sensing means connected to the generator control means, the generator control means modifying the charging profile according to the battery temperature.

12. A battery recharging system as defined in claim 7, wherein the charging profile can be independent of battery temperature.

13. An aircraft electrical system, which comprises:

an engine;

a starter/generator connected to the engine to generate electrical energy when the engine operates and to provide torque to the engine to start the engine when the engine is stopped;

an electrical bus connected to the starter/generator to supply electrical energy therefrom;

a voltage regulator connected to the bus to control the voltage of the electrical energy on the bus;

a battery connected to the bus, the battery supplying electrical energy to the starter/generator to start the engine and the battery being discharged thereby, the battery receiving electrical energy on the bus to be recharged; and a generator control unit connected to operate the voltage regulator, the generator control unit directing the voltage regulator to change the voltage on the bus according to a preset battery charging profile, the generator control unit capable of causing the voltage regulator to decrease the voltage on the bus after the battery has supplied electrical energy to the starter/generator to avoid a large battery inrush current transient, the generator control unit capable of causing the voltage regulator to increase the voltage on the bus to a level above normal battery charging level to increase the battery charging rate, the generator control unit then reducing the voltage level on the bus following battery charging to the normal battery charging level to maintain battery charge.

14. An aircraft electrical system as defined in claim 13, comprising in addition a temperature sensor connected to sense the temperature of the battery, the temperature sensor operatively connected to the generator control unit, the generator control unit modifying the battery charging profile according to the battery temperature.

15. An aircraft electrical system as defined by claim 13, wherein the generator control unit is connected to monitor electrical energy supplied to the starter/generator by the battery during a powered engine start cycle, and varies the charging profile in accordance therewith.

16. An aircraft electrical system as defined in claim 15, wherein the generator control unit monitors current supplied to the starter/generator from the battery.

17. An aircraft electrical system as defined in claim 13, wherein the charging profile can be independent of battery temperature.

18. A method of recharging a battery subjected to periodic substantial discharges, which comprises the steps of:

providing a predetermined battery charging profile of voltage levels, a predetermined battery charging profile being provided which can be independent of battery temperature;

using the charging profile to change the level of voltage supplied to the battery during different portions of the recharging operation; and returning the charging voltage to the normal charging voltage to maintain battery charge.

19. A method of recharging a battery as defined in claim 18, wherein the changing step includes initially reducing the charging voltage to the battery to avoid a high initial inrush of current.

20. A method of recharging a battery as defined in claim 18, wherein the changing step includes increasing the charging voltage above a normal charging voltage to increase the charging rate of the battery.

21. A method of recharging a battery as defined in claim 18, comprising the additional steps of:

measuring the temperature of the battery, and modifying the charging profile according to the battery temperature.

22. A method of recharging a battery as defined in claim 21, wherein the modifying step includes reducing the voltage levels if the battery temperature is high to prevent overcharging.

23. A method of recharging a battery as defined in claim 18, comprising the additional steps of:

monitoring the current by the battery during battery discharge; and modifying the charging profile according to the current monitored.

* * * * *